US006282161B1

United States Patent
Son et al.

(10) Patent No.: US 6,282,161 B1
(45) Date of Patent: Aug. 28, 2001

(54) OPTICAL RECORDING AND REPRODUCING APPARATUS, TILT ADJUSTING METHOD APPROPRIATE THEREFOR, AND RECORDING CONTROL METHOD

(75) Inventors: Yong-ki Son, Suwon; Pyong-yong Seong, Seoul; Byung-ryul Ryoo; Seok-jung Kim, both of Suwon; Joong-eon Seo, Uiwang; In-wook Hwang, Suwon; Young-sun Seo, Sungnam, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/369,127

(22) Filed: Aug. 5, 1999

(30) Foreign Application Priority Data

Aug. 5, 1998 (KR) .................................. 98-31871

(51) Int. Cl.⁷ ...................................................... G11B 3/90
(52) U.S. Cl. .................................. 369/53.19; 369/53.12; 369/44.27
(58) Field of Search ..................... 369/44.11, 44.27, 369/44.29, 44.31, 44.32, 44.33, 44.35, 44.39, 44.37, 44.38, 54, 58, 47.55, 53.12, 53.13, 53.14, 53.18, 53.19, 53.37

(56) References Cited

U.S. PATENT DOCUMENTS

| 5,805,543 | * | 9/1998 | Takamine et al. | 369/44.32 |
| 5,886,962 |   | 3/1999 | Takamine et al. | 369/44.32 |
| 5,898,654 | * | 4/1999 | Shimada et al.  | 369/44.32 |

FOREIGN PATENT DOCUMENTS

| 0 443 822 A2 | 8/1991  | (EP) . |
| Hei-4-45315  | 4/1972  | (JP) . |
| 7320284      | 12/1995 | (JP) . |
| 8-45081      | 2/1996  | (JP) . |
| 8-45095      | 2/1996  | (JP) . |
| 8045081      | 2/1996  | (JP) . |
| 8055341      | 2/1996  | (JP) . |
| 8-293126     | 11/1996 | (JP) . |
| WO 97-26651  | 7/1997  | (WO) . |

OTHER PUBLICATIONS

Patent Abstracts of Japan vol. 016, No. 035 (P–1304), Jan. 28, 1992 (1992–01028) & JP 03 242832 A (Victor Co of Japan Ltd), Oct. 29, 1991 *abstract*.

* cited by examiner

Primary Examiner—Paul W. Huber
(74) Attorney, Agent, or Firm—Staas & Halsey LLP

(57) ABSTRACT

An optical recording and reproducing apparatus for adjusting a tilt of an optical pickup in accordance with an amount of jitter of a reproduction signal, a tilt adjusting method therefor, and a recording control method. The optical recording and reproducing apparatus includes an optical pickup having an object lens, a tilt adjusting unit for adjusting a tilt angle of the object lens, a jitter detecting unit for detecting an amount of jitter of a reproducing signal generated by the optical pickup from a disk, and a tilt controlling unit for minimizing the amount of jitter by feeding the amount of jitter detected by the jitter detecting unit back to the tilt adjusting unit. According to the optical recording and reproducing apparatus, there is no need for a space in which a displacement sensor detecting the tilt angle of the optical pickup faces the disk.

29 Claims, 5 Drawing Sheets

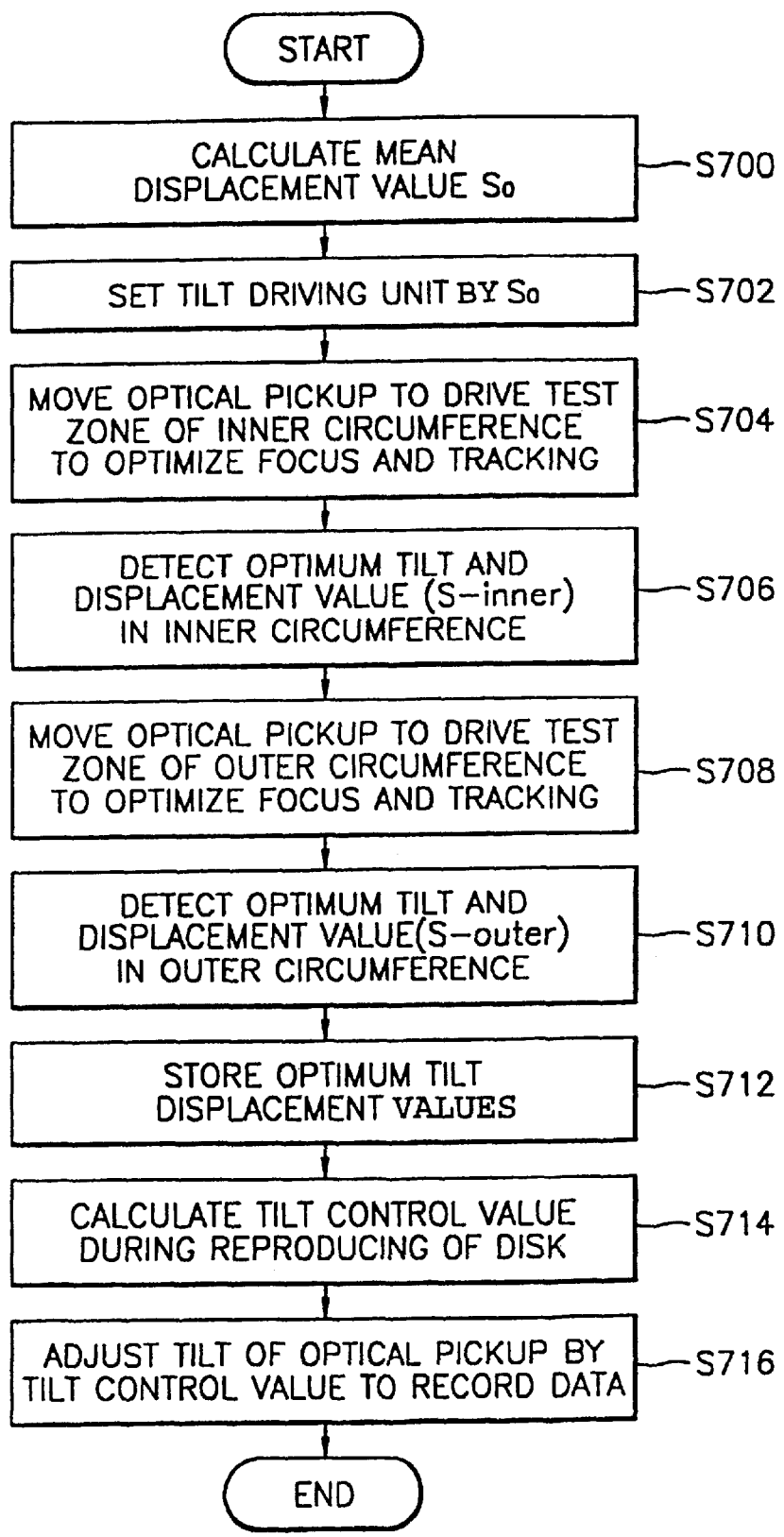

OPTICAL RECORDING AND REPRODUCING APPARATUS, TILT ADJUSTING METHOD APPROPRIATE THEREFOR, AND RECORDING CONTROL METHOD

CROSS-REFERENCE TO RELATED APPLICATIONS

This application claims the benefit of Korean Application No. 98-31871, filed Aug. 5, 1998, in the Korean Patent Office, the disclosure of which is incorporated herein by reference.

BACKGROUND OF THE INVENTION

1. Field of the Invention

The present invention relates to an optical recording and reproducing apparatus and a tilt adjusting method, and more particularly, to an optical recording and reproducing apparatus for adjusting a tilt of an optical pickup in accordance with the amount of jitter of a reproducing signal, a tilt adjusting method therefor, and a recording control method therefor.

2. Description of the Related Art

An optical pickup of an optical recording and reproducing apparatus requires an actuator which is an object lens driver. The actuator may precisely move the object lens to a desired position in response to a magnetic field generated by a permanent magnet.

However, when an optical disk is curved while the optical recording and reproducing apparatus records and reads information on or from the disk, or when there is a tilt in an optical pickup during assembly of the optical recording and reproducing apparatus, the optical signal deteriorates. In order to compensate for the deterioration of the optical signal, the relative tilt amount between the disk and the object lens must be measured to remove the measured tilt amount.

FIG. 1 shows the structure of a conventional tilt adjusting apparatus. The apparatus of FIG. 1 includes a tilt detector for applying an optical signal to the disk and detecting the tilt amount by the optical signal reflected from the disk and a tilt motor (not shown) which adjusts the tilt of the optical pickup in accordance with the detected tilt amount.

The tilt detector includes a light emitting device 12 fixed on the optical pickup 10 and light receiving devices 14a and 14b to detect the tilt amount between the optical axis and the disk. The signals detected from the light receiving devices 14a and 14b become input signals for driving a tilt motor through a differential amplifier (not shown).

The tilt motor drives the optical pickup 10 to remove the tilt amount and thus to suppress deterioration of the optical signal. The optical pickup 10 pivots around a fixing and supporting axis 18. The tilt motor moves one side of the optical pickup 10 upward or downward around the fixing and supporting axis 18.

However, in the conventional tilt adjusting apparatus of FIG. 1, the tilt detector is arranged on the upper surface of the optical pickup to apply an optical signal to the disk or the size is relatively large, which defined a space.

The tilt detector cannot be arranged in the same position as the objective lens, so that the tilt amount of a current reproduction position cannot be precisely detected.

An additional adjusting apparatus is required to obtain an initial position when the tilt detector is installed on the upper surface of the optical pickup. Also, the amount of light is changed according to the reflection rate of a disk when light beams emitted from the light emitting device are reflected from the disk, so that the precision of tilt measurement and tilt adjustment is deteriorated in a disk having a low reflection rate.

SUMMARY OF THE INVENTION

To solve the above problems, it is an object of the present invention to provide an apparatus for compensating for deterioration of an optical signal due to a tilt between a disk and an object lens.

It is another object of the present invention to provide a method of adjusting the tilt between the disk and the object lens using the above apparatus.

It is still another object of the present invention to provide a recording control method of optimizing an amount of jitter of a record signal using the apparatus.

Additional objects and advantages of the invention will be set forth in part in the description which follows and, in part, will be obvious from the description, or may be learned by practice of the invention.

An optical reproducing apparatus to achieve the first and other objects of present invention includes an optical pickup; a tilt adjusting unit for adjusting the tilt angle of the optical pickup; a jitter detecting unit for detecting the amount of jitter of a reproducing signal generated by the optical pickup; and a tilt controlling unit for minimizing the amount of jitter by feeding the amount of jitter detected by the jitter detecting unit back to the tilt adjusting unit.

Here, preferably, the optical recording and reproducing apparatus further comprises a displacement sensor for detecting the tilt angle of the optical pickup with respect to a predetermined reference surface, wherein the tilt controlling unit obtains optimum tilt adjustment values at two points of the optical pickup spaced apart from each other along the radial direction of the disk, and the tilt angle is adjusted by interpolation of the obtained optimum tilt adjustment values.

Here, preferably, the optical recording and reproducing apparatus further comprises a memory for storing the optimum tilt adjustment values obtained from the tilt controlling unit.

It is also preferable that the displacement sensor comprises a light emitting device for generating an optical signal; a reflector for reflecting an optical signal generated from the light emitting device; and a light receiving device for receiving an optical signal reflected from the reflector, and generating an electrical signal corresponding thereto.

Preferably, the reflector is installed on an optical pickup support unit on which the optical pickup is mounted and which is rotatable about an axis fixed relative to an optical pickup fixing frame. The optical pickup fixing frame has the light emitting and receiving device mounted thereon.

To achieve the second and other objects of the present invention, a tilt adjusting method is provided, the tilt adjusting method of an optical recording and reproducing apparatus having an optical pickup including an object lens, a tilt adjusting unit for adjusting the tilt angle of the object lens, a displacement sensor detecting the tilt degree of the optical pickup with respect to a predetermined reference surface, a jitter detecting unit for detecting the amount of jitter of a reproducing signal generated by the optical pickup, and a tilt controlling unit for minimizing the amount of the jitter by feeding the amount of jitter detected by the jitter detecting means back to the tilt adjusting unit, comprises: (a) moving the optical pickup to an inner circumference of a disk when the disk is mounted on the optical pickup apparatus, operating a focus and a tracking servo to adjust an offset of the focus and the track servo such that the jitter of a reproducing signal is minimized, and driving the tilt driving unit to detect a displacement amount value S_inner of the displacement sensor at a point at which the jitter of the reproducing signal is minimized; (b) moving the optical pickup to an outer circumference of the disk, operating the focus and the tracking servo to adjust the offset of the focus and the track servo such that the jitter of the reproducing signal is minimized, and driving the tilt driving unit to detect a displacement amount value S_outer of the displacement sensor at the point in which the jitter of the reproducing signal is minimum; (c) storing the displacement amount values S_inner and S_outer in which the jitter at the inner and outer circumferences, respectively, of the disk are minimized; (d) calculating a tilt control value of a reproducing position by interpolation with reference to the stored displacement amount values S_inner and S_outer during reproduction of the disk; and (e) applying the calculated tilt control value to the tilt driving unit to adjust the tilt of the optical pickup.

A recording control method to achieve the third and other objects of the present invention is provided, the recording control method of an optical recording and reproducing apparatus having an optical pickup including an object lens, a tilt adjusting unit for adjusting the tilt angle of the object lens, a displacement sensor detecting the tilt degree of the optical pickup with respect to a predetermined reference surface, a jitter detecting unit for detecting an amount of jitter of a reproducing signal generated by the optical pickup, and a tilt controlling unit for minimizing the amount of jitter by feeding the amount of the jitter detected from the jitter detecting unit back to the tilt adjusting unit, comprises: moving the optical pickup to a drive test zone at an inner circumference of the disk, operating a focus and a tracking servo to adjust an offset of the focus and the track servo such that the jitter of the reproducing signal is minimized, and driving the tilt driving unit to detect an optimum displacement value S_inrec of the displacement sensor at a point in which the jitter of the recording signal is minimized; moving the optical pickup to a drive test zone in an outer circumference of the disk, operating the focus and the tracking servo to adjust the offset of the focus and the track servo such that the jitter of the reproducing signal is minimized, and driving the tilt driving unit to detect an optimum displacement value S_outrec of the displacement sensor at a point in which the jitter of the recording signal is minimized; storing the optimum displacement values S_inrec and S_outrec minimizing the jitter in the inner and the outer circumferences of the disk, respectively, in a memory; calculating a tilt control value of a recording position by interpolation with reference to the stored optimum displacement values S_inner and S_outer during recording on the disk; and applying the calculated tilt control value to the tilt driving unit to adjust the tilt of the optical pickup record data.

BRIEF DESCRIPTION OF THE DRAWINGS

The above objects and advantages of the present invention will become more apparent by describing in detail preferred embodiment thereof with reference to the attached drawings, in which:

FIG. 7 is a flowchart showing a recording adjusting method according to still another embodiment of the present invention.

DESCRIPTION OF THE PREFERRED EMBODIMENTS

Figure 1:
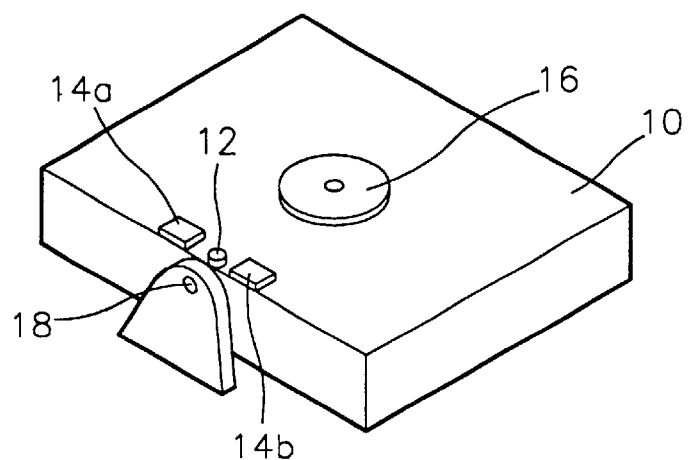
FIG. 1 shows the structure of an optical recording and reproducing apparatus having a conventional tilt adjusting apparatus.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
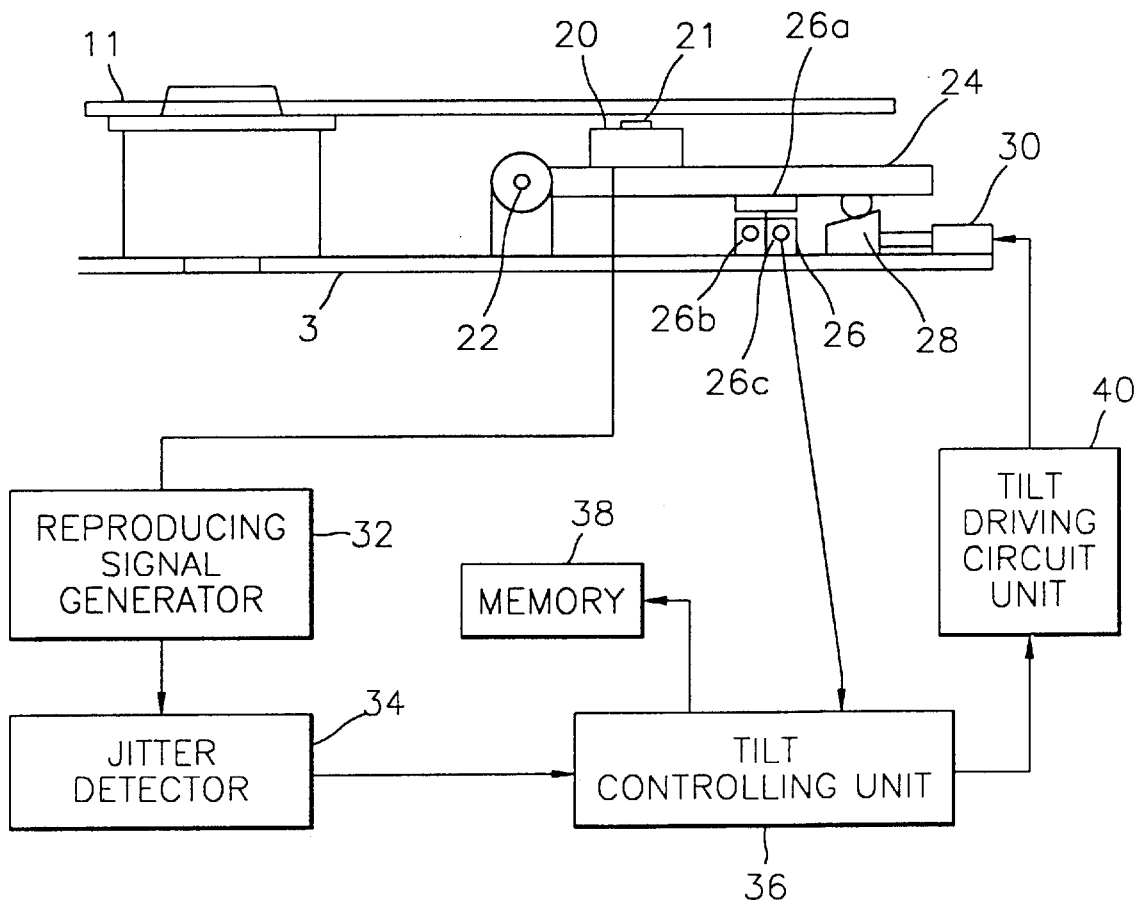
FIG. 2 shows the structure of an optical recording and reproducing apparatus having a tilt adjusting apparatus according to an embodiment the present invention.

FIG. 2 shows the structure of an optical recording and reproducing apparatus according to an embodiment of the present invention.

The optical recording and reproducing apparatus shown in FIG. 2 includes an optical pickup 20, an optical pickup support unit 24, a displacement sensor 26, a tilt driving unit 28, a tilt driving motor 30, a reproducing signal generator 32, a jitter detector 34, a tilt controlling unit 36, and a memory 38. The optical pickup 20 records information on a disk 11 or reproduces the information recorded on the disk 11 and includes an object lens 21. The optical pickup support unit 24 on which the optical pickup 20 is positioned pivots around a fixing support 22. The displacement sensor 26 includes a reflector 26a fixed on a lower surface of the optical pickup support unit 24, a light emitting device 26b fixed on an upper surface of an optical pickup fixing frame 3 and a light receiving device 26c. The reproducing signal generator 32 generates a reproducing signal corresponding to information recorded on the disk from the optical signal received in the optical pickup 20. The jitter detector 34 detects the amount of jitter of the reproducing signal generated by the reproducing signal generator 32. The tilt controlling unit 36 feeds the amount of the jitter of the reproducing signal generated by the jitter detector 34 back to a tilt driving circuit unit 40 to control the tilt angle of the optical pickup 20. The output of the tilt driving circuit unit 40 is output to the tilt driving unit 30 which in turn drives the tilt driving unit 28. The tilt driving unit 28 rotates (tilts) the optical pickup support unit 24 about the fixing support 22. The memory 38 stores a reference tilt adjustment value.

Figure 3:
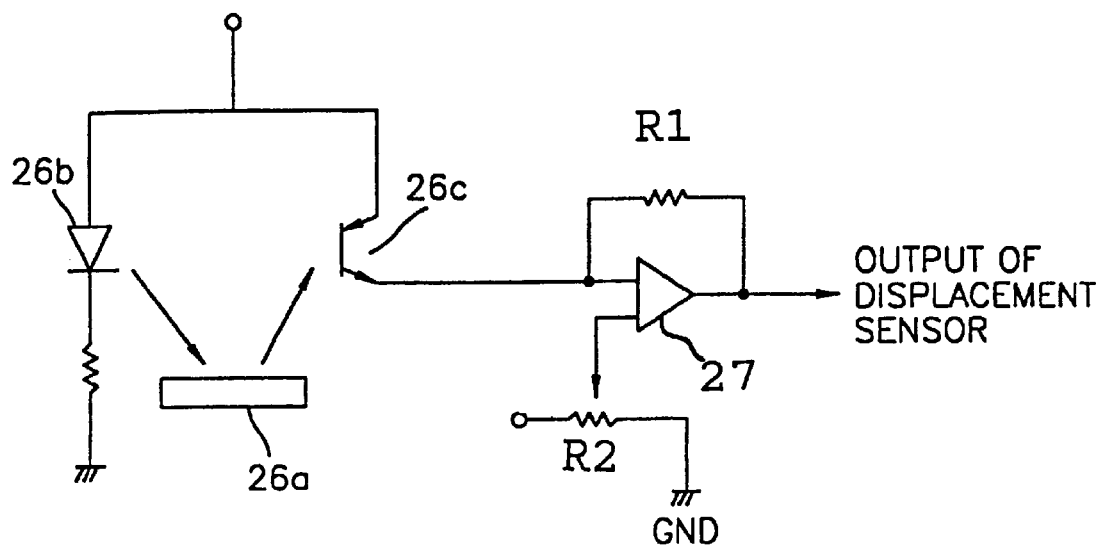
FIG. 3 is a circuit diagram showing a detailed structure of a displacement sensor shown in FIG. 2.

As shown in FIG. 3, the displacement sensor 26 measures the amount of light detected by the light receiving device 26c which detects an optical signal reflected from the reflector 26a after emission from the light emitting device 26b to thereby detect the displacement of the optical pickup 20. The reflector 26a is installed at a predetermined angle with respect to the light emitting device 26b, e.g., 180° and separated by a predetermined distance. The output of the light receiving device 26c is transmitted to a first input terminal of an operational amplifier 27. A resistor R1 has a first end connected to the first input terminal and a second end connected to an output terminal of the operational amplifier 27. A second input terminal of the operational amplifier 27 is connected to a resistor R2, which in turn is connected to ground.

Since the object lens 21 is the part of the optical pickup 22 moving clockwise or counterclockwise around the fixing support 22, the object lens 21 tilts to the upper surface of the optical pickup support unit 24 when the optical pickup support unit 24 tilts according to the tilt driving unit 28. The angle of the object lens 21 with respect to the optical pickup fixing frame 3 is detected by the displacement sensor 26.

Figure 4:
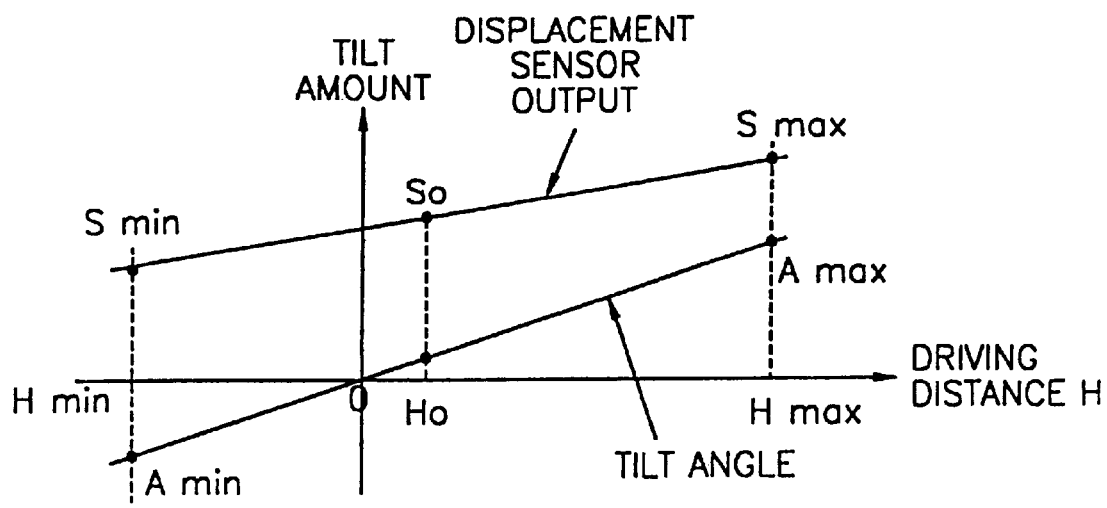
FIG. 4 is a graph showing characteristics of the displacement sensor shown in FIG. 2.

In FIG. 4, the horizontal axis indicates a driving distance and the vertical axis indicates a tilt amount and a tilt angle. A lower solid line indicates the tilt angle and an upper solid line indicates the output of the displacement sensor. As shown in FIG. 4, the output of the displacement sensor 26 is almost linearly changed in accordance with the tilt angle of the optical pickup 20.

In the optical recording and reproducing apparatus shown in FIG. 2, the jitter is adjusted in accordance with the control of the tilt driving unit 28 such that the amount of jitter detected by the jitter detector 34 is minimized, and the displacement sensor 26 determines the tilt angle of the optical pickup 20 caused by the tilt driving unit 28.

Figure 5:
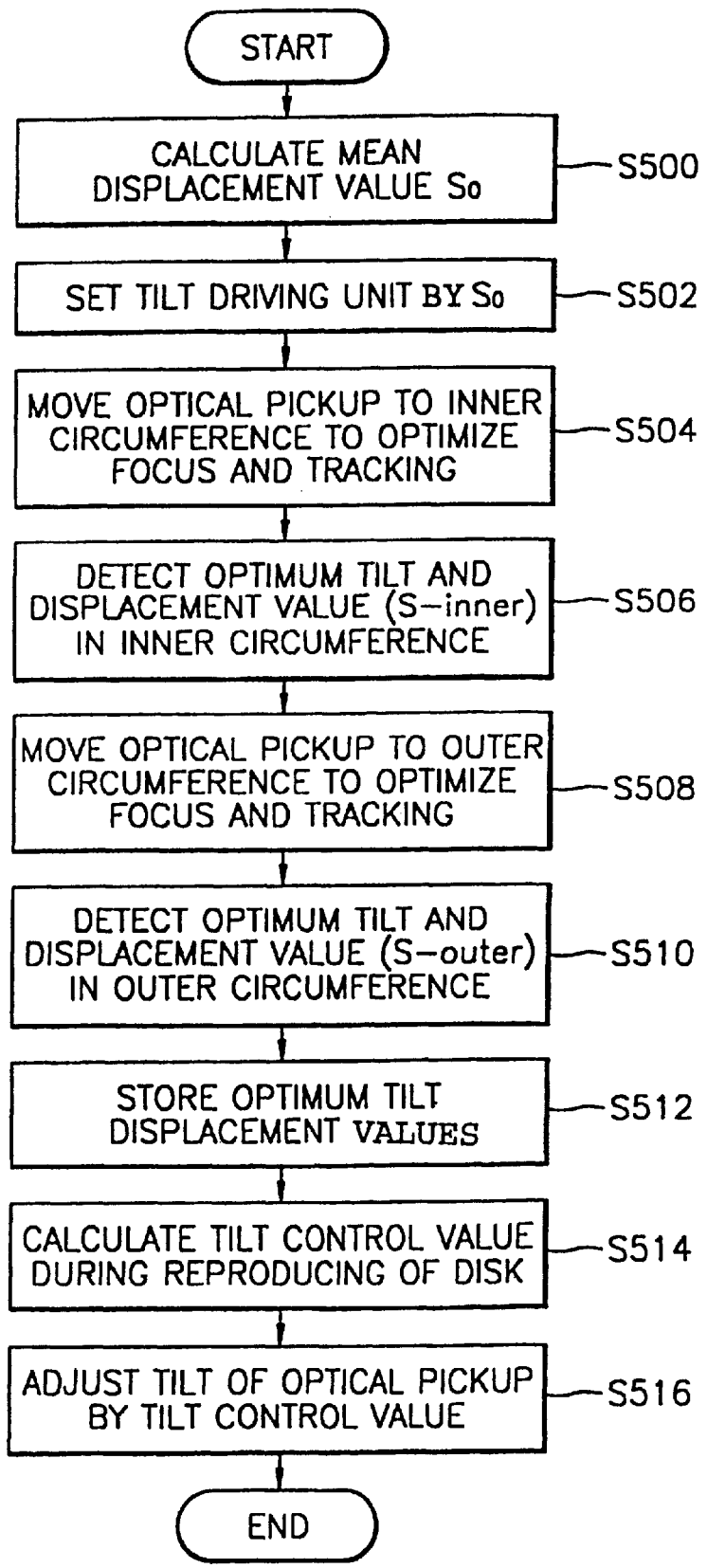
FIG. 5 is a flowchart showing a tilt adjusting method according to another embodiment of the present invention.

Referring to FIG. 5, when a power supply is applied, the tilt driving unit 28 is driven by a maximum driving distance $H_{max}$ and a minimum driving distance $H_{min}$ which are the limits that the tilt driving unit 28 may tilt the optical pickup support unit 24, and the outputs $S_{max}$ and $S_{min}$ of the displacement sensor 26 corresponding thereto are measured, and then $(S_{max}-S_{min})/2$ is calculated by a mean displacement value $S_0$ (step 500).

Then, the tilt driving unit 28 is set by $S_0$ such that the displacement sensor 26 indicates the mean displacement value $S_0$ (step 502). Here, the driving distance is a mean driving distance $H_0$. $H_0$ is a reference point of servo operation and tilt adjustment during mounting of a disk.

When the disk is mounted on the optical pickup apparatus, the optical pickup 20 is moved to an inner portion of the disk, for instance, to a lead-in region about 23 mm from the center, and then a focus and a tracking state are optimized such that the jitter of the reproducing signal is minimized (step 504). At this time, the tilt driving unit 28 is driven by the tilt driving motor 30 to detect the output S_inner of the displacement sensor 26 from a point in which the jitter of the reproducing signal is minimized (step 506).

The optical pickup 20 is moved to an outer circumference position of the disk, for instance to a lead-out region about 58 mm from the center, and then the focus and the tracking states are optimized such that the jitter of the reproducing signal is minimized (step 508). At this time, the output S_outer of the displacement sensor 26 is detected from a point in which the jitter of the reproducing signal is minimized while the tilt driving unit 28 is driven (step 510).

In the optical recording and reproducing apparatus, as the jitter becomes smaller, the jitter signal is an indicator that the reproducing state of the data recorded on the disk gets better.

When an optical axis of an optical pickup and a disk reflection surface tilt from a vertical axis, the pit state of the disk is not good or the state of the focus and the track servo is instable, and a jitter signal deteriorates. According to the present invention, the focus and the tracking servo are optimized. Thus, the optimum tilt adjustment value is obtained from a point in which the jitter is minimum while the tilt is changed.

Figure 6:
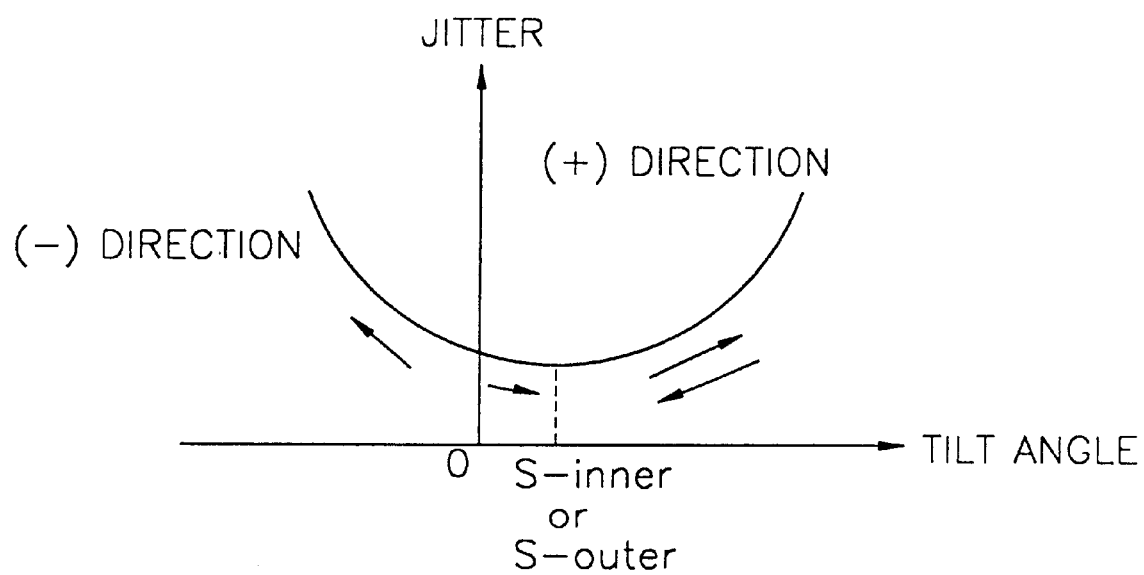
FIG. 6 is a graph showing a relationship between an amount of jitter and a tilt amount in the optical recording and reproducing apparatus shown in FIG. 2.

Referring to FIG. 6, as shown in FIG. 5, the tilt driving unit 28 tilts the optical pickup 20 to the (+) direction of increasing the output of the displacement sensor 26 so that a point where the jitter is minimum can be found, and when the jitter increases, the tilt driving unit 28 tilts the optical pickup 20 in a direction to reduce the jitter. When the jitter is reduced, the tilt driving unit 28 continues tilting the optical pickup 20 in the direction of reducing the jitter, and when the jitter is increased, the tilt driving unit 28 returns the optical pickup 20 to the previous tilt, at the point where the jitter is minimized.

When the optimum displacement values S_inner and S_outer in which the jitter is minimized at inner and outer circumferences of the disk are detected, respectively, the detected optimum displacement values are stored in the memory 38 (step 512).

The tilt controlling unit 36 calculates a tilt control value from a reproducing position by interpolation with reference to an optimum tilt displacement value of the inner and outer circumferences stored in the memory 38 during reproduction of the disk (step 514).

The calculated tilt control value is applied to the tilt driving unit 28 to adjust the tilt of the optical pickup (step 516). That is, by the method as shown in FIG. 5, the displacement in which the jitter is minimum is obtained from inner and outer circumferences of the disk, and the displacement in which the jitter is minimum at an arbitrary point is estimated by interpolation.

The apparatus and the method shown in FIGS. 2 and 5 can be used together with another pit controlling method. In a method for adjusting a tilt in accordance with a pit signal, and when the outer circumference of a DVD-RAM disk has no pit, the tilt cannot be adjusted by the pit signal. At this time, in a drive test zone, the tilt can be adjusted by the method and the apparatus according to the present invention.

The jitter adjusting method according to the present invention can be used to ensure an optimal recording state in a recording mode. In the recording mode, the tilt of the drive test zone can be determined with reference to the output of the displacement sensor, and the tilt amount in which the jitter of the recorded signal is optimum can be detected.

Referring to FIG. 7, when power is applied, the tilt driving unit 28 is driven by a maximum driving distance $H_{max}$ and a minimum driving distance $H_{min}$ and the outputs $S_{min}$ and $S_{max}$ of the displacement sensor 26 corresponding thereto are measured, and then $(S_{max}-S_{min})/2$ is calculated by a mean displacement value $S_0$ (step 700).

Then, the tilt driving unit 28 is set by $S_0$ such that the displacement sensor 26 indicates the mean displacement value $S_0$ (step 702). At this time, a driving distance is a mean driving distance $H_0$. $H_0$ is a reference point of the servo operation of the disk and the tilt adjustment during mounting of the disk.

The optical pickup 20 is moved to a drive test zone of the inner circumference of the disk before recording, and then the focus and the tracking state are optimized such that the jitter of the recording signal is minimized (step 704).

The tilt driving unit 28 is driven to detect the output S_inner of the displacement sensor from a point at which the jitter of the recording signal is minimum (step 706).

A method for detecting a point at which the jitter of the recording signal is a minimum is as follows.

A test signal is recorded on drive test zones at both the inner and outer circumferences of the disk. The recorded test signal is reproduced at both of the drive test zones, and the amount of jitter of the reproduced test signal is detected for both of the drive test zones.

The optical pickup 20 tilts in the direction of increasing the output of the displacement sensor 26 and the test signal is recorded on the drive test zone of the inner circumference, and then the amount of jitter of the reproduced test signal is detected. The detected amount of jitter is compared with the previous amount of jitter. When the jitter is increased, the optical pickup 20 tilts in the direction of reducing the jitter. When the jitter is reduced, the optical pickup continues tilting in the direction of reducing the jitter, and when the jitter is again increased, returns to a previous tilt, so that the point at which the jitter is a minimum can be found.

The optical pickup 20 is moved to a drive test zone located in the outer circumference of the disk, and the test signal is recorded on the drive test zone at the outer circumference of the disk, and a focus and the tracking state are optimized such that the jitter of the recording (reproduced test signal) signal is a minimum (step 708).

The tilt driving unit 28 is driven to detect the output S_outrec of the displacement sensor 26 from a point in which the jitter of the recording signal is a minimum (step 710).

Then, optimum displacement values S_inrec and S_outrec in which the jitter of the inner and outer circumferences, respectively, of the disk, are minimized are stored in the memory 38 (step 712).

The tilt control value is calculated at the recording position by interpolation with reference to the outputs S_inrec and S_outrec stored in the memory 38 during recording of the disk (step 714).

The calculated tilt adjustment value is applied to the tilt driving unit 28 to adjust the tilt of the optical pickup to record data (step 716).

By the above-described method, tilt caused by a curvature of the disk or assembly error in a disk whole interval is determined and compensated for, which enables optimal recording and reproducing.

As described above, according to the optical recording and reproducing apparatus of the present invention, there is no need for a space in which a displacement sensor detecting the tilt angle of the optical pickup faces the disk. Also, the optical recording and reproducing apparatus of the present invention has no need for an additional adjusting apparatus for adjusting the displacement sensor. In addition, the tilt with respect to the whole interval of the disk can be detected.

According to the optical recording and reproducing apparatus of the present invention, displacement is detected using one light emitting device and one light receiving device so that production costs are reduced, and the size of the displacement sensor can be reduced.

Further, according to the optical recording and reproducing apparatus of the present invention, the tilt angle can be detected regardless of the reflection rate of the disk so that the accuracy of the measurement and adjustment can be increased.

What is claimed is:

1. An optical recording and/or reproducing apparatus to record information on and/or reproduce the information from a disk, the optical recording and/or reproducing apparatus comprising:
   an optical pickup;
   a tilt adjusting unit which adjusts a tilt angle of the optical pickup;
   a jitter detecting unit which adjusts an amount of jitter of a reproducing signal generated by the optical pickup from the disk;
   a displacement sensor which detects the tilt angle of the optical pickup with respect to a predetermined reference surface; and
   a tilt controlling unit which minimizes the amount of the jitter by feeding the amount of the jitter detected by the jitter detecting unit back to the tilt adjusting unit.

2. The optical recording and/or reproducing apparatus as claimed in claim 1, of wherein the tilt controlling unit obtains optimum tilt adjustment values from two points spaced apart from each other in a radial direction of the disk, and the displacement sensor determines the tilt angle by interpolation of the obtained optimum tilt adjustment values.

3. The optical recording and/or reproducing apparatus as claimed in claim 2, further comprising a memory which stores the optimum tilt adjustment values obtained from the tilt controlling unit.

4. The optical recording and/or reproducing apparatus as claimed in claim 2, wherein the displacement sensor comprises:
   a light emitting device which generates an optical signal;
   a reflector which reflects the optical signal generated by the light emitting device; and
   a light receiving device which receives the optical signal reflected from the reflector, and generates an electrical signal corresponding thereto.

5. The optical recording and/or reproducing apparatus as claimed in claim 4, further comprising:
   an optical pickup fixing frame on which the light emitting and receiving devices are mounted, and
   an optical pickup support unit on which the optical pickup is mounted and which is rotatable about an axis fixed relative to the optical pickup fixing frame.

6. A tilt adjusting method of an optical recording and/or reproducing apparatus having an optical pickup including an object lens, a tilt adjusting unit for adjusting a tilt angle of an object lens, a displacement sensor for detecting the tilt degree of the optical pickup, a jitter detecting unit for detecting an amount of jitter of a reproducing signal generated by the optical pickup from the disk, and a tilt controlling unit for minimizing the amount of jitter by feeding the amount of the jitter detected by the jitter detecting unit back to the tilt adjusting unit, the tilt adjusting method comprising:
   moving the optical pickup to an inner circumference of the disk when the disk is mounted on the optical pickup apparatus, operating a focus and a tracking servo to adjust an offset of the focus and the track servo such that the jitter of the reproducing signal is minimized, and detecting a displacement amount value S_inner with respect to a predetermined surface using the displacement sensor at a first point at which the jitter of the reproducing signal is minimized;
   moving the optical pickup to an outer circumference of the disk, operating the focus and the tracking servo to adjust the offset of the focus and the track servo such that the jitter of the reproducing signal is minimized, and detecting a displacement amount value S_outer with respect to the predetermined surface using the displacement sensor at a second point at which the jitter of the reproducing signal is minimized;
   storing the displacement amount S_inner and S_outer in which the jitter at the inner and outer circumferences of the disk are minimized, respectively;
   determining a tilt control value of a reproducing position by interpolation with reference to the stored displacement amount values S_inner and S_outer during reproduction of the disk; and applying the calculated tilt control value to the tilt driving unit to adjust the tilt of the optical pickup.

7. The tilt adjusting method as claimed in claim 6, further comprising:

driving the tilt driving unit by a maximum driving unit displacement Hmax and a minimum driving unit displacement Hmin when power is applied, and measuring the outputs Smax and Smin of the displacement sensor corresponding thereto, respectively and then obtaining a mean displacement value Savr from the outputs Smax and Smin; and driving the tilt driving unit such that the displacement sensor indicates the mean displacement value Savr to initialize the tilt driving unit.

8. The tilt adjusting method as claimed in claim 6, wherein each of said steps (a) and (b) comprises:

driving the tilt driving unit in a direction increasing or reducing the tilt of the optical pickup;

checking whether the amount of the jitter detected by the jitter detecting unit is increased or reduced;

driving the tilt driving unit in the direction of reducing the amount of jitter when the detected amount of jitter is increased; and detecting a point in which the amount of jitter is changed to be increased, to determine when the jitter is minimized.

9. A recording control method of an optical recording and reproducing apparatus having an optical pickup including an object lens, a tilt adjusting unit for adjusting a tilt angle of the object lens, a displacement sensor for detecting the tilt degree of the optical pickup, a jitter detecting unit for detecting an amount of jitter of a reproducing signal generated by the optical pickup from a disk, and a tilt controlling unit for minimizing the amount of jitter by feeding the amount of the jitter detected from the jitter detecting unit back to the tilt adjusting, the recording control method comprising the steps of:

moving the optical pickup to a first drive test zone at an inner circumference of the disk, operating a focus and a tracking servo to adjust an offset of the focus and the track servo such that the jitter of the reproducing signal is minimized, and detecting an optimum displacement value S_inrec with respect to the predetermined surface using the displacement sensor at a first point at which the jitter of the recording signal is minimized;

moving the optical pickup to a second drive test zone at an outer circumference of the disk, operating the focus and the tracking servo to adjust the offset of the focus and the track servo such that the jitter of the reproducing signal is minimized, and detecting an optimum displacement value S_outrec with respect to the predetermined surface using the displacement sensor at a second point at which the jitter of the recording signal is minimized;

storing the optimum displacement values S_inrec and S_outrec minimizing the jitter in the inner and the outer circumferences of the disk, respectively, in a memory;

determining a tilt control value of a recording position by interpolation with reference to the stored optimum displacement values S_inner and S_outer during recording on the disk; and applying the calculated tilt control value to the tilt driving unit to adjust the tilt of the optical pickup to record data.

10. An optical recording and/or reproducing apparatus to record information on and/or reproduce information from a disk, the optical recording and/or reproducing apparatus comprising:

an optical pickup to generate a reproducing signal by generating and reflecting a light beam from the disk, and which is movable to adjust a tilt of the optical pickup relative to the disk;

a displacement sensor which detects the tilt angle of the optical pickup with respect to a predetermined reference surface; and a tilting unit to determine an amount of jitter of the reproducing signal and adjusting the tilt of the optical pickup based upon the amount of jitter.

11. The optical recording and/or reproducing apparatus as claimed in claim 10, wherein the tilting unit determines a first value of the amount of the jitter while the optical pickup generates the reproducing signal at an inner circumference of the disk and determines a second value of the amount of the jitter while the optical pickup generates the reproducing signal at an outer circumference of the disk, and uses the first and second values to determine interpolated adjustment of the tilt of the optical pickup while the optical pickup generates the reproducing signal at various positions along a radius of the disk.

12. The optical recording and/or reproducing apparatus as claimed in claim 10, wherein the tilting unit determines a first jitter value of the amount of the jitter the optical pickup generates the reproducing signal at an inner circumference of the disk, the displacement sensor generates a first displacement value corresponding to the first jitter value, the tilting unit determines a second jitter value of the amount of the jitter while the optical pickup generates the reproducing signal at an outer circumference of the disk, the displacement sensor generates a second displacement value corresponding to the second jitter value, and the tilting unit interpolates the first and second displacement values to adjust the tilt of the optical pickup while the optical pickup generates the reproducing signal at various positions along a radius of the disk.

13. The optical recording and/or reproducing apparatus as claimed in claim 11, wherein the tilting unit adjusts the tilt of the optical pickup while the optical pickup generates the reproducing signal at the inner circumference of the disk to minimize the first jitter value of the reproducing signal at the inner circumference, wherein the displacement sensor generates the first displacement value corresponding to the tilt of the optical pickup when first jitter value is minimized, the tilting unit adjusts the tilt of the optical pickup while the optical pickup generates the reproducing signal at the outer circumference of the disk to minimize the second jitter value of the reproducing signal at the outer circumference, wherein the displacement sensor generates the second displacement value corresponding to the tilt of the optical pickup when second jitter value is minimized.

14. The optical recording and/or reproducing apparatus as claimed in claim 13, wherein the tilting unit further comprises:

a jitter detector to detect the amount of the jitter of the reproducing signal;

a tilt controlling unit to generate tilt control values according to the detected amount of jitter;

a tilt driving unit to adjust the tilt of the optical pickup according to the tilt control values.

15. The optical recording and/or reproducing apparatus as claimed in claim 14, further comprising:

an optical pickup fixing frame;
an optical pickup support unit on which the optical pickup is mounted; and
a fixing support mounted on the optical pickup fixing frame and about which the optical pickup support unit is mounted;
wherein the displacement sensor comprises
  a light emitting device mounted on the optical pickup fixing frame and which generates an optical signal,
  a reflector mounted on a side of the optical pickup support unit opposite to that of the optical pickup and which reflects the optical signal, and
  a light receiving device mounted on the optical pickup fixing frame and which receives the reflected optical signal to generate the first and second displacement values.

16. An optical recording and/or reproducing apparatus to record information on and/or reproduce information from a disk, the optical recording and/or reproducing apparatus comprising:
  an optical pickup to generate a recording signal by generating and reflecting a light beam from the disk, and which is movable to adjust a tilt of the optical pickup relative to the disk;
  a displacement sensor to detect the tilt angle of the optical pickup with respect to a predetermined reference surface; and
  a tilting unit to determine an amount of jitter of the recording signal and adjusting the tilt of the optical pickup based upon the amount of jitter.

17. The optical recording and/or reproducing apparatus as claimed in claim 16, wherein the optical pickup records the recording signal at first and second drive test zones at inner and outer circumferences of the disk, respectively, wherein the tilting unit determines a first value of the amount of the jitter while the optical pickup reproduces the recording signal at the first test drive zone at the inner circumference of the disk and determines a second value of the amount of the jitter while the optical pickup reproduces the recording signal at the outer circumference of the disk, and uses the first and second values to determine interpolated adjustment of the tilt of the optical pickup while the optical pickup generates the reproducing signal at various positions along a radius of the disk.

18. The optical recording and/or reproducing apparatus as claimed in claim 16, wherein the optical pickup records the recording signal at first and second drive test zones at inner and outer circumferences of the disk, respectively, wherein the tilting unit determines a first jitter value of the amount of the jitter while the optical pickup reproduces the recording signal at the inner circumference of the disk, the displacement sensor generates a first displacement value corresponding to the first jitter value, the tilting unit determines a second jitter value of the amount of the jitter while the optical pickup reproduces the recording signal at the outer circumference of the disk, the displacement sensor generates a second displacement value corresponding to the second jitter value, and the tilting unit interpolates the first and second displacement values to adjust the tilt of the optical pickup while the optical pickup generates the recording signal at various positions along a radius of the disk.

19. The optical recording and/or reproducing apparatus as claimed in claim 18, wherein the tilting unit adjusts the tilt of the optical pickup while the optical pickup reproduces the recording signal at the inner circumference of the disk to minimize the first jitter value of the reproducing signal at the inner circumference, wherein the displacement sensor generates the first displacement value corresponding to the tilt of the optical pickup when the first jitter value is minimized, the tilting unit adjusts the tilt of the optical pickup while the optical pickup reproduces the recording signal at the outer circumference of the disk to minimize the second jitter value of the reproducing signal at the outer circumference, wherein the displacement sensor generates the second displacement value corresponding to the tilt of the optical pickup second jitter value is minimized.

20. The optical recording and/or reproducing apparatus as claimed in claim 19, wherein the tilting unit further comprises:
  a jitter detector to detect the amount of the jitter of the reproduced recording signal;
  a tilt controlling unit to generate tilt control values according to the detected amount of jitter; and
  a tilt driving unit to adjust the tilt of the optical pickup according to the tilt control values.

21. The optical recording and/or reproducing apparatus as claimed in claim 20, further comprising:
  an optical pickup fixing frame;
  an optical pickup support unit on which the optical pickup is mounted; and
  a fixing support mounted on the optical pickup fixing frame and about which the optical pickup support unit is mounted;
  wherein the displacement sensor comprises
    a light emitting device mounted on the optical pickup fixing frame and which generates an optical signal,
    a reflector mounted on a side of the optical pickup support unit opposite to that of the optical pickup and which reflects the optical signal, and
    a light receiving device mounted on the optical pickup fixing frame and which receives the reflected optical signal to generate the first and second displacement values.

22. A tilt adjusting method of adjusting a tilt of an optical pickup relative to a disk on which information is recorded and/or from which information is reproduced, the tilt adjusting method comprises:
  generating a reproducing signal by generating and reflecting a light beam from the disk;
  determining an amount of jitter of the reproducing signal;
  detecting the tilt angle of the optical pickup with respect to a predetermined reference surface; and
  adjusting the tilt of the optical pickup based on the amount of jitter.

23. The tilt adjusting method as claimed in claim 22, wherein the determining an amount of jitter comprises:
  adjusting the tilt of the optical pickup while the optical pickup generates the reproducing signal at an inner circumference of the disk, to determine a first tilt angle at which the jitter is minimized;
  adjusting the tilt of the optical pickup while the optical pickup generates the reproducing signal at an outer circumference of the disk, to determine a second tilt angle at which the jitter is minimized; and
  interpolating sensed tilt values corresponding to the first and second tilt angles.

24. The tilt adjusting method as claimed in claim 23, wherein the adjusting the tilt of the optical pickup comprises adjusting the tilt of the optical pickup while the optical pickup generates the reproducing signal at various positions along a radius of the disk based upon the interpolated sensed tilt values.

25. The tilt adjusting method as claimed in claim 23, further comprising:

calculating a mean tilt sense value of a displacement sensor by adjusting the tilt of the optical pickup to minimum and maximum movement positions to determine minimum and maximum sensed tilt values; and averaging the maximum and minimum sensed tilt values, to determine a mean sensed tilt value;

wherein the adjusting of the tilt of the optical pickup while the optical pickup generates the reproducing signal at the inner and outer circumferences of the of the disk starts at tilt positions of the optical pickup corresponding to the mean sensed tilt value.

26. A tilt adjusting method of adjusting a tilt of an optical pickup relative to a disk on which information is recorded and/or from which information is reproduced, the tilt adjusting method comprises:

recording a recording signal on the disk;

reproducing the recording signal;

determining an amount of jitter of the recording signal;

detecting the tilt angle of the optical pickup with respect to a predetermined reference surface; and adjusting the tilt of the optical pickup based upon the amount of jitter.

27. The adjusting method as claimed in claim 26, wherein the determining an amount of jitter comprises:

adjusting the tilt of the optical pickup while the optical pickup reproduces the recording signal at an inner circumference of the disk, to determine a first tilt angle at which the jitter is minimized;

adjusting the tilt of the optical pickup while the optical pickup reproduces the recording signal at an outer circumference of the disk, to determine a second tilt angle at which the jitter is minimized; and interpolating sensed tilt values corresponding to the first and second tilt angles.

28. The tilt adjusting method as claimed in claim 27, wherein the adjusting the tilt of the optical pickup comprises adjusting the tilt of the optical pickup while the optical pickup generates the recording signal at various positions along a radius of the disk based upon the interpolated sensed tilt values.

29. The tilt adjusting method as claimed in claim 27, further comprising:

calculating a mean tilt sense value of the displacement sensor by adjusting the tilt of the optical pickup to minimum and maximum movement positions to determine minimum and maximum sensed tilt values; and averaging the maximum and minimum sensed tilt values, to determine a mean sensed tilt value;

wherein the adjusting of the tilt of the optical pickup while the optical pickup reproduces the recording signal at the inner and outer circumferences of the of the disk starts at tilt positions of the optical pickup corresponding to the mean sensed tilt value.

\* \* \* \* \*